United States Patent Office 3,531,536
Patented Sept. 29, 1970

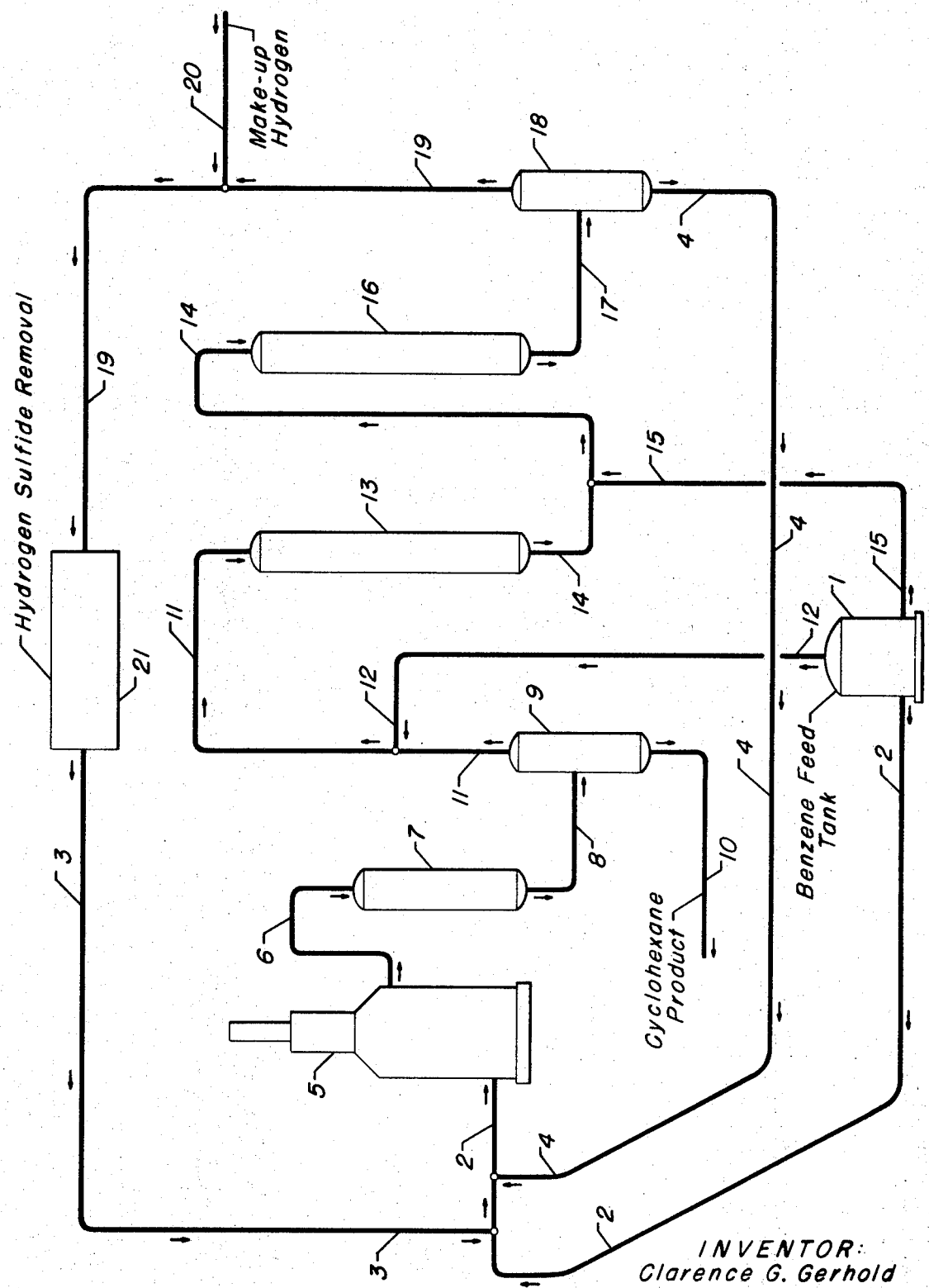

3,531,536
AROMATIC HYDROGENATION PROCESS
Clarence G. Gerhold, Palatine, Ill., assignor to Universal Oil Products Company, Des Plaines, Ill., a corporation of Delaware
Filed June 2, 1969, Ser. No. 829,662
Int. Cl. C07c 5/10
U.S. Cl. 260—667                                    10 Claims

ABSTRACT OF THE DISCLOSURE

A multiple-stage hydrogenation system wherein the hydrogenated product is removed from the process at a locus other than the last reaction zone. The process is especially applicable in situations involving sulfurous feed stock. A preferred embodiment constitutes cyclohexane production from a benzene concentrate.

APPLICABILITY OF INVENTION

The present invention encompasses a process for effecting the hydrogenation of aromatic hydrocarbons such as benzene, toluene, the varied xylenes, naphthalenes, etc., to form the corresponding cyclic paraffins. When utilized for the hydrogenation of aromatic hydrocarbons which are contaminated by sulfurous compounds, especially thiophenic compounds, the present invention is advantageous in that it affords 100.0% conversion without the necessity for the substantially complete prior removal of the sulfur compounds. More specifically, the present invention is directed toward a process for the hydrogenation of sulfur-contaminated benzene to form substantially pure cyclohexane, which process is effected catalytically in a particular manner and under certain conditions of operation. In addition to those aromatic hydrocarbons mentioned above, my invention affords advantages in the hydrogenation of substituted aromatic hydrocarbons such as ethylbenzene, di-ethylbenzene, and various mono-, di-, and tri-substituted aromatic hydrocarbons, etc. The corresponding cyclic paraffins, resulting from the hydrogenation of the aromatic nuclei, include compounds such as cyclohexane, mono-, di-, and tri-substituted cyclohexanes, Decalin (decahydronaphthalene), Tetralin (tetrahydronaphthalene), etc. Cycloparaffinic hydrocarbons are extensively utilized in commercial industries for a wide variety of purposes. For example, cyclohexane is required in exceedingly large quantities for the manufacture of nylon, and as a solvent for various fats, oils, waxes, etc. Cyclohexane is also employed in the manufacture of crude rubber and various resins, and is used as a component of paint and varnish remover. The mono-, di-, and tri-substituted cyclohexanes can be used as the starting materials in various organic syntheses. Decalin is used as an organic solvent for heavier fats and oils, as a stain remover, as a substitute for turpentine, etc. Tetralin finds use as a solvent for various resins, for asphaltic material, as an ingredient in shoe polish, etc. The greater majority of uses dictate that the cycloparaffin, for example cyclohexane, exist in a substantially pure state, being particularly uncontaminated by the corresponding aromatic hydrocarbon.

In the interest of brevity, the following discussion will be directed toward the hydrogenation of benzene to form substantially pure cyclohexane. It is, however, understood that the method of the present invention may be utilized to advantage in hydrogenation processes regardless of the character of the aromatic hydrocarbon feed stock. Although cyclic paraffins are readily found in various petroleum hydrocarbon fractions and/or distillates, and often in substantial quantities, it is very difficult to effect recovery thereof by distillation due to the tendency to form azeotropic mixtures. On the other hand, a series of distillation and/or extraction procedures may be utilized to obtain substantially pure aromatic hydrocarbons. For example, a benzene-containing fraction, such as a full boiling range naphtha (150° F. to about 400° F.) may be subjected to fractional distillation to provide a heart-cut containing the benzene. This heart-cut is then subjected to a solvent extraction process which separates the benzene from the normal, or iso-paraffinic components, and naphthenes contained therein. A benzene concentrate is readily recovered from the selected solvent by way of distillation. In this manner, benzene, as well as concentrates of other aromatic hydrocarbons, may be obtained in a purity of 99.0%, or more.

Heretofore, the hydrogenation of aromatic hydrocarbons has been effected with a nickel-containing catalytic composite at hydrogenation conditions. The use of a nickel-containing catalyst is disadvantageous in many respects, and especially in view of the fact that nickel is quite sensitive to sulfurous compounds, contained in the benzene concentrate, at the operating conditions necessary to effect saturation of the aromatic nuclei. Nickel-containing catalysts become deactivated through inter-reaction with the sulfurous compounds, whereby the nickel component is converted into a sulfide. Notwithstanding that the formation of nickel sulfide is at least partially reversible, even under the most conducive conditions the reaction is not reversible to the extent that a sufficient quantity of the nickel becomes catalytically active for effecting additional hydrogenation of aromatic nuclei. In other words, the nickel-containing catalyst, although fairly active initially, does not possess sufficient stability.

The process encompassed by my invention makes use of a refractory inorganic oxide carrier material with which is composited a noble metal component (from Group VIII) and an alkali metal and/or alkaline-earth metal component. The Group VIII noble metal component may be platinum, palladium, ruthenium, rhodium, osmium, or iridium. It appears that the use of either platinum and/or palladium yields more advantageous results, and these noble metals are, therefore, preferred. In general, the noble metal component will be utilized in a concentration of from about 0.01% to about 2.0% by weight of the final catalyst, calculated as the elements thereof. The alkali metal and/or alkaline-earth component, including cesium, lithium, rubidium, sodium, calcium, magnesium, and/or strontium, will be employed in a concentration of not more than about 5.0% by weight of the catalyst. In order to achieve the proper balance between inhibiting the occurrence of side reactions, and imparting the desired degree of stability to the noble metal-containing catalyst, it is preferred to employ the alkali and/or alkaline-earth metals in significantly lower concentrations. Therefore, they will generally be present in a concentration within the range of from about 0.1% to about 1.0% by weight, calculated as the elements thereof.

While neither the precise composition, nor the method of manufacturing the catalyst is an essential feature of my invention, certain considerations are preferred. For example, since the fresh feed to the present process is an aromatic concentrate, and the desired normally liquid product effluent is a cycloparaffinic concentrate, the catalyst should not possess the propensity to promote ring-opening and/or hydrocracking reactions. Thus, the catalytic composite employed herein is intentionally made substantially free from "acid-acting" components, and is herein referred to as being "non-acidic." For example, the catalytically active metallic components hereinabove set forth are preferably combined with a non-siliceous, substantially halide-free carrier material such as alumina. A substantially "halide-free" composite is one wherein halogen is not intentionally added as a component, and, in those instances where a halogen component (chloroplatinic acid) is employed in the catalyst manufacturing process, steps are taken to reduce the halogen content to the lowest possible level.

OBJECTS AND EMBODIMENTS

A principal object of the present invention is to hydrogenate aromatic hydrocarbons to the corresponding cycloparaffinic hydrocarbons. A corollary objective involves providing stability and selectivity in a process for the hydrogenation of substantially pure aromatic hydrocarbons contaminated by the inclusion of sulfurous compounds.

A specific object of my invention involves providing a process for the hydrogenation of sulfur-contaminated aromatic hydrocarbons, which process results in a greater degree of naphthenic purity in the ultimately desired product stream. In conjunction with this objective is the fact that the present process involves a system which results in a more active and stable catalyst, and a correspondingly more complete hydrogenation reaction.

Therefore, one embodiment of my invention relates to a process for hydrogenating an aromatic hydrocarbon, containing sulfurous compounds, which comprises reacting said aromatic hydrocarbon with hydrogen, at hydrogenating conditions, in parallel flow through a plurality of reaction zones containing a catalytic composite of a porous carrier material and a Group VIII noble metal component, and maintained under an imposed pressure above about 100 p.s.i.g., separating the product effluent from the first of said reaction zones to recover a hydrogenated hydrocarbon product, separating the product effluent from the last of said reaction zones to provide (1) a hydrogen-rich recycle gas stream and (2) a hydrogenated hydrocarbon stream, recycling at least the major portion of said hydrogenated hydrocarbon stream to the first reaction zone in said plurality, and removing hydrogen sulfide from said hydrogen-rich gas stream prior to recycling the same to the first of said reaction zones.

Other embodiments of my invention are directed toward preferred processing techniques, operating conditions, as well as various compositions of the catalytic composite for utilization herein. Other objects and embodiments will become evident from the following, more detailed description of my invention.

DESCRIPTION OF CATALYTIC COMPOSITES

The porous carrier material, utilized in the preferred catalytic composites used in the process of my invention, may be prepared in any suitable manner, and may be activated prior to use by one or more treatments including drying, calcination, steaming, etc. Since the precise method of preparing the carrier material is not essential to my invention, a detailed discussion herein is not believed necessary to a clear understanding. The carrier material may be formed into any desired shape such as spheres, pills, cakes, extrudates, powders, granules, etc. A particularly preferred form is the sphere and, spheres may be continuously manufactured by the well known oil-drop method which comprises forming an hydrosol by any of the techniques taught in the art, combining the hydrosol with a suitable gelling agent and dropping the resultant mixture into an oil bath maintained at elevated temperatures. Further details for the production of spherical particles may be found in U.S. Pat. No. 2,620,314, issued to James Hoekstra. In view of the fact that the catalytic composites used in my process should be substantially "non-acidic," the preferred carrier material is alumina in and of itself, and particularly absent acid-function substances such as silica, halogen, etc.

Since a halogen-containing compound is often utilized during one or more steps of the overall catalyst manufacturing procedure, for example, the Group VIII noble metal component is often impregnated throughout the finished alumina through the use of chloropalladic acid or chloroplatinic acid, the finished catalyst will contain some halogen. Although steps may be taken during the preparation of the catalytic composite to reduce the concentration of combined halogen to the lowest possible level, it is extremely difficult to achieve concentrations lower than about 0.1% by weight. This undesirable acidity is countered and inhibited through the use of the alkalinous metal component.

The alkalinous metal component, employed for the purpose of attenuating the acid-function possessed by residual halogen, by the carrier material and/or by the Group VIII noble metal component, is selected from those hereinabove described. Of these, lithium and/or potassium appear to yield the best results. Regardless of the particular state in which the component exists within the final catalytic composite, the quantities thereof are calculated as if the component existed in the elemental state. It is a preferred procedure to incorporate the alkalinous metal component during the preparation of the carrier material; therefore, the carrier is often referred to as, for example, "lithiated alumina." Another method, sometimes preferred, calls for impregnating the alkali metal as the last component in order to facilitate distribution of the other metal components.

The Group VIII noble metal component, preferably platinum and/or palladium, is used in an amount of from about 0.01% to about 2.0% by weight, calculated as if existing in the elemental state. As hereinbefore set forth, the use of a nickel-containing catalyst is disadvantageous from the standpoint of the degree of irreversibility of the reaction whereby the nickel component is converted to nickel sulfide. Although the Group VIII noble metal component, for example platinum, is also converted into platinum sulfide, the reaction is more readily reversible than that involving the nickel component and tends to reverse as the temperature of the catalyst is increased. However, an extensive increase in reaction temperature, such as with charge stocks excessively contaminated by sulfurous compounds, tends to promote a corresponding increase in reactions other than hydrogenation, whereby the aromatic nuclei are converted to hydrocarbons other than the desired cycloparaffin. With aromatic concentrates containing excessively high concentrations of sulfurous compounds, the increase in cracking activity attendant the necessary increase in temperature may be attenuated by incorporating a rhenium component within the catalytic composite. As with the Group VIII noble metal component, the rhenium component is also utilized in an amount within the range of from about 0.01% to about 2.0% by weight. Both the rhenium component and the Group VIII noble metal component may be incorporated within the catalytic composite in any suitable manner including coprecipitation with the carrier, or impregnation of the carrier with a suitable water-soluble compound of the metal. Following the incorporation of the metallic components, for example by way of impregnation, the carrier material is dried and subjected to a high temperature calcination technique, which technique is thoroughly described within the prior art. A particularly preferred catalytic composite comprises alumina, platinum, lithium and rhenium. Excellent results are achieved with a catalyst containing from about 0.1% to about 1.0% by weight of lithium, 0.3% to about 0.9% by weight of platinum and 0.1% to about 0.8% by weight of rhenium, calculated as the elemental metals regardless of their state within the catalytic composite. The final catalytic composite, following impregnation of the catalytically active metallic components, will generally be dried at a temperature of from about 200° F. to about 400° F., for a period of from about 2 to about 24 hours. The dried composite is then calcined at an elevated temperature of from about 700° F. to about 1100° F., and for a period of about 0.5 to about 10 hours.

PROCESS CONDITIONS AND TECHNIQUES

Although the process encompassed by my invention may be conducted in a single reaction zone, containing a multiplicity of catalyst beds, the complicated construction and the degree of operational difficulty cause such an operation to be economically nonfeasible. The more advantageous system involves a plurality of reaction zones, the flow through which is in part in series, and in part in parallel. Although any suitable number of reaction zones may be employed, the use of three reaction zones is preferred. Two reaction zones do not appear to result in as complete a conversion of the benzene to cyclohexane without the use of unnecessarily high temperatures which inherently result in undersirable side reactions. More than three reaction zones does not appear to yield additional benefits, and is therefore, considered uneconomical and unwarranted. Examplary of those prior art processes, for the hydrogenation of aromatic hydrocarbons to produce cycloparaffins, which processes utilize a multiplicity of reaction zones, is the subject of U.S. Pat. No. 3,054,833, issued to G. R. Donaldson, et al. Referring to this process, it is noted that the total reaction product effluent from the last reaction zone in the series is introduced into a high-pressure separator, from which is withdrawn (1) a hydrogen sulfide-containing, hydrogen-rich gaseous phase and (2) a normally liquid product stream. The former is introduced into suitable hydrogen sulfide removal facilities, and the enriched hydrogen stream is recycled to the inlet of the first reaction zone in the series. A portion of the normally liquid stream is also recycled to the first reaction zone, while the remainder is subjected to stabilization for the purpose of recovering a cyclohexane concentrate.

An essential feature of my invention, as hereinafter discussed with reference to the accompanying drawing, resides in the withdrawal of the net hydrogenated liquid stream from a reactor which is not last in the series. In a preferred mode of operation, the net liquid is removed from the effluent from the first reaction zone in the series by cooling the stream to the extent necessary to effect a degree of partial condensation sufficient to separate out a liquid product consisting of the total hydrogenated aromatic produced in the overall process. This is in contradistinction to the prior art processes wherein the product is withdrawn from the last reaction zone by way of complete condensation.

The principal advantages attendant the process flow of the present invention, over the conventional process flow, are: (1) since the hydrogen recycle gas purification system is not located at the same position within the reactor train, or series, as is the liquid product withdrawal, the concentration of hydrogen sulfide in the gas at the point at which the final product is formed, is less than would be in the gaseous phase in the conventional system, thus resulting in a more stable and active catalyst, and a correspondingly more complete hydrogenation; and, (2) the separation of the naphthenic product by way of partial condensation induces an additional purification step as a result of the lower volatility of the naphthene compared to that of the azeotrope or an aromatic impurity such as bi-phenyl.

Although not necessary to my invention, the total volume of catalyst utilized in the process may be divided into approximately equal portions, each of which is disposed within one of the three reaction zones. Similarly, the total fresh benzene feed may be added in three approximately equal portions, one each to the inlet of each of the three reaction zones. While the benzene, therefore, passes in parallel flow through the reaction zones, the recycled hydrogen-rich gaseous phase, including make-up hydrogen to compensate for that consumed within the overall process, and the cyclohexane recycle passes in series-flow through the reaction zones. Since the reaction is exothermic in nature, this particular series-parallel flow pattern, in conjunction with the quantity of catalyst disposed within each individual reaction zone, permits the temperature rise in each zone to be limited by restricting the quantity of benzene in the reactant mixture introduced into an individual reaction zone.

Approximately one-third of the total benzene fresh feed is commingled with recycled cyclohexane and hydrogen, and is charged to the first reaction zone. The mixture is previously heated to a temperature such that the maximum catalyst bed temperature is in the range of about 200° F. to about 800° F. The cyclohexane recycle is utilized in an amount greater than three times the volumetric quantity of benzene being charged to the first reaction zone; the hydrogen is employed in an amount sufficient to yield a mole ratio of hydrogen to cyclohexane, in the effluent from the last reaction zone, not substantially less than about 4.0:1. The effluent from the first reaction zone is introduced into a high pressure separator, after being cooled to a temperature such that partial condensation of the cyclohexane is effected. The cyclohexane condensate is removed from the separator as the product of the process, and the remainder of the first reaction zone effluent, along with another portion of fresh benzene, is introduced into the second reaction zone. The temperature to which the first reaction zone product effluent is cooled, in order to effect partial condensation of the cyclohexane, is well within the purview of those possessing skill in the art. However, a convenient control exists whereby the temperature can be reasonably determined. That is, the quantity of cyclohexane withdrawn from the separator as the product of the process, should be such that the volumetric ratio of cyclohexane to the fresh benzene charge to the first reaction zone is not less than about 3.0:1.

The mixture entering the second reaction zone is heated, by way of heat-exchange with various hot effluent streams, to a temperature of about 300° F. Similarly, the effluent from the second reaction zone is commingled with approximately one-third of the total benzene charge, will be subsequently cooled to a temperature of about 300° F., and introduced into the last reaction zone. As utilized herein, the "liquid hourly space velocity" relates to the total quantity of benzene in parallel flow to the reaction zones and the total quantity of catalyst disposed in the plurality of reaction zones. The LHSV is generally in the range of about 1.0 to about 10.0. The total effluent from the last reaction zone in this series is cooled to a temperature in the range of about 60° F. to about 140° F., and introduced into a second high pressure separator. A hydrogen-rich vaporous phase is removed from the separator and recirculated to the first reaction zone as a portion of the hydrogen necessary for the reaction; the normally liquid phase, being substantially pure cyclohexane, is recycled to the inlet of the first reaction zone. Prior to being recycled to the first reaction zone, the hydrogen-rich gaseous phase is introduced into a suitable hydrogen sulfide removal system for the purpose of further increasing the hydrogen concentration.

The process of the present invention, when effected in accordance with the conditions stated herein, is capable of producing a cyclohexane stream of greater than 99.5% purity, for an extended period of time and without the need for frequent, expensive shutdowns necessitated by a deactivated catalyst.

Since the hydrogenation of aromatic hydrocarbons, to the corresponding cycloparaffins, involves the consumption of at least 3 moles of hydrogen per mole of aromatic hydrocarbon, make-up hydrogen is introduced into the system. This may come from any suitable external source such as a catalytic reforming process which produces large quantities of a highly concentrated, hydrogen-rich gas stream. Although the reaction zones may be maintained under an imposed pressure within the range of about 100 p.s.i.g. to about 2,000 p.s.i.g., it is advantageous to utilize an intermediate pressure of about 300 to about 1,000 p.s.i.g. Higher pressures tend to promote the hydrogenation of aromatic nuclei, but likewise increase the degree of hydrocracking and ring-opening whereby low molecular weight, straight-chain paraffinic hydrocarbons are formed. Obviously, the formation of such light hydrocarbons results in a decrease in the volumetric yield of cyclohexane.

DESCRIPTION OF DRAWING

In further describing the present process, reference will be made to the accompanying drawing which is presented for the sole purpose of illustration. In the drawing, the embodiment is presented by means of a simplified flow diagram in which such details as pumps, instrumentation and controls, heat-exchange and heat-recovery circuits, valving, start-up lines and similar hardware have been eliminated as non-essential to an understanding of the techniques involved. The use of such miscellaneous appurtenances, to modify the process as illustrated, will be evident to those possessing skill in the art. The process flow will be described in conjunction with a commercially-scaled, fixed-bed catalytic hydrogenation unit intended for the production of cyclohexane. The catalytic composite, utilized in the total quantity of about 6,000 pounds, is a non-acidic alumina carrier material with which is combined about 0.4% by weight of palladium, 0.5% by weight of lithium and about 0.2% by weight of rhenium, and is equally divided in 2,000-pound loadings in three reaction zones. The total fresh benzene charge is 1,207 bbl./day, resulting in an overall LHSV (hereinbefore defined) of about 2.6.

With reference now to the drawing, 77.3 moles per hour (468 bbl./day) of fresh benzene charge is withdrawn from benzene feed tank 1 by way of line 2, and is admixed with a recycle hydrogen-rich stream in line 3, the latter being in an amount of 2,818.6 moles per hour. The hydrogen/benzene mixture is commingled with 506.2 moles per hour (3,620 bbl./day) of a cyclohexane concentrate in line 4, the final mixture continuing through line 2 into heater 5. Upon entering heater 5, the mixture is at a temperature of about 100° F. and a pressure of about 490 p.s.i.g.; the heated mixture is introduced by way of line 6 into reaction zone 7 at a temperature of about 400° F. and a pressure of about 455 p.s.i.g.

The effluent from the first reaction zone, at a temperature of about 618° F. and a pressure of about 450 p.s.i.g., is withdrawn by way of line 8, and after being utilized as a heat-exchange medium, is introduced into separator 9 wherein partial condensation of cyclohexane is effected; the cyclohexane is withdrawn by way of line 10. A principally vaporous phase is withdrawn from separator 9 by way of line 11 and is admixed with 81.5 moles per hour (493 bbl./day) of fresh benzene charge by way of line 12, the mixture continuing through line 11 into the second reaction zone 13. Prior to entering reaction zone 13, the temperature of the mixture is increased to a level of about 400° F. by way of heat-exchange with various hot effluent streams. The pressure at the inlet to reaction zone 13 is about 445 p.s.i.g., and a pressure drop of about 5 p.s.i.g. is experienced as the reactant mixture traverses the catalyst bed therein. The product effluent from reaction zone 13 is withdrawn by way of line 14 at a temperature of about 608° F., and is admixed with 40.7 (246 bbl./day) of additional fresh benzene feed in line 15. The temperature of the mixture is about 578° F., which temperature is decreased to a level of 400° F. by way of an inter-cooler. The mixture enters reaction zone 16 at a pressure of about 435 p.s.i.g., and is withdrawn at a temperature of 500° F. and a pressure of 430 p.s.i.g. by way of line 17.

Following its utilization as a heat-exchange medium, to lower its temperature to about 100° F., the product effluent in line 17 is introduced thereby into a high-pressure separator 18 from which is removed a hydrogen-rich vaporous phase by way of line 19. Make-up hydrogen, in an amount of 635.5 moles per hour, of which 613.7 moles per hour is hydrogen, is introduced into the process by way of line 20, the hydrogen-rich mixture being introduced into hydrogen sulfide removal system 21 by way of compressive means not illustrated in the drawing. High-pressure separator 18 is the focal point for pressure control throughout the system, and the compressive means functions in a manner such that the hydrogen-rich mixture in line 19, entering hydrogen sulfide removal system 21 is at a level of about 490 p.s.i.g.

Although any suitable means may be utilized to remove hydrogen sulfide from the hydrogen recycle stream, such as adsorption through the use of silica gel, a preferred scheme utilizes a combination caustic scrubbing/water washing column. The substantially hydrogen sulfide-free recycle hydrogen, in an amount of 2,818.6 moles per hour is removed by way of line 3, and is admixed with fresh benzene charge and cyclohexane concentrate recycle in line 2 as hereinbefore set forth. The cyclohexane-rich product in line 10 is introduced into a stabilizer column at a temperature of about 280° F. The stabilizing column is maintained under a pressure of about 300 p.s.i.g., the reboiler temperature is about 445° F. and the top temperature is about 345° F. The final cyclohexane product is withdrawn from the stabilizing column as a bottoms stream in an amount of 203.5 moles per hour (about 1,500 bbl./day).

It is significant that the overall process is effected with only 2.5% by weight of the fresh benzene feed being "lost" by way of light paraffinic hydrocarbons. Analyses indicate that the cyclohexane product has a purity of about 99.75%, the contaminant being principally iso- and normal hexane.

The foregoing specification, and especially the example integrated into the description of the drawing, clearly illustrates the method by which the present invention is effected, and the benefits to be afforded through the utilization thereof.

I claim as my invention:

1. A process for hydrogenating an aromatic hydrocarbon, containing sulfurous compounds, which comprises reacting said aromatic hydrocarbon with hydrogen, at hydrogenating conditions, in parallel flow through a plurality of reaction zones containing a catalytic composite of a porous carrier material and a Group VIII noble metal component, and maintained under an imposed pressure above about 100 p.s.i.g., the inlet temperature to each of said reaction zones being at least about 200° F., separating the product effluent from the first of said reaction zones to recover a hydrogenated hydrocarbon product, separating the product effluent from the last of said reaction zones to provide (1) a hydrogen-rich recycle gas stream and (2) a hydrogenated hydrocarbon stream, recycling at least the major portion of said hydrogenated hydrocarbon stream to the first reaction zone in said plurality and, removing hydrogen sulfide from said hydrogen-rich gas stream prior to recycling the same to the first of said reaction zones.

2. The process of claim 1 further characterized in that said hydrogen and said hydrogenated hydrocarbon stream pass in series flow through said plurality of reaction zones.

3. The process of claim 1 further characterized in that said first zone product effluent is separated to provide (1) said hydrogenated product effluent and (2) a mixed-phase hydrogen/hydrogenated hydrocarbon stream, and introducing said mixed-phase stream into a succeeding reaction zone in said plurality.

4. The process of claim 1 further characterized in that the total quantity of benzene in parallel flow through said plurality of reaction zones is sufficient to result in an LHSV, based upon the total quantity of catalyst disposed in said plurality, of from about 1.0 to about 10.0.

5. The process of claim 1 further characterized in that the mol ratio of said hydrogenated hydrocarbon recycled to the first reaction zone in said plurality to the total benzene passing in parallel flow to said reaction zones is within the range of about 0.5:1 to about 5.0:1.

6. The process of claim 1 further characterized in that said aromatic hydrocarbon is benzene and said hydrogenated hydrocarbon is cyclohexane.

7. The process of claim 1 further characterized in that said catalytic composite comprises from about 0.01% to about 2.0% by weight of said Group VIII noble metal component, from about 0.1% to about 1.0% by weight of an alkali metal component and a porous carrier material.

8. The process of claim 7 further characterized in that said noble metal component is a palladium component.

9. The process of claim 7 further characterized in that said noble metal component is a platinum metal component.

10. The process of claim 7 further characterized in that said alkali metal component is a lithium component.

References Cited

UNITED STATES PATENTS

| | | | |
|---|---|---|---|
| 3,054,833 | 9/1962 | Donaldson et al. | 260—667 |
| 3,426,088 | 2/1969 | Proctor | 260—667 |
| 3,428,697 | 2/1969 | Zulu et al. | 260—667 |

DELBERT E. GANTZ, Primary Examiner

V. O'KEEFE, Assistant Examiner